Nov. 30, 1926.                                                          1,608,755
                    E. G. McCAULEY ET AL
                    PROPELLER FOR AIRCRAFT
                    Filed Oct. 24, 1923         2 Sheets-Sheet 2

INVENTOR
Ernest G. McCauley
Frank W. Caldwell
BY
Robert H. Young
ATTORNEY

Patented Nov. 30, 1926.

1,608,755

UNITED STATES PATENT OFFICE.

ERNEST G. McCAULEY AND FRANK W. CALDWELL, OF DAYTON, OHIO.

PROPELLER FOR AIRCRAFT.

Application filed October 24, 1923. Serial No. 670,518.

This invention relates to propellers for aircraft generally and is particularly concerned with a propeller having adjustable, detachable and interchangable blades.

One of the objects of the invention is to provide a propeller having an improved form of blade mounting, with which the blades may be adjusted and balanced with the minimum of difficulty and whereby the blades are securely held.

Another object of the invention is to provide in connection with the blade mounting a means for indicating the extent of adjustment of the blades for pitch setting.

The invention embraces other objects, as for example, structural details, which will be brought out in the course of the following description.

Figure 1:
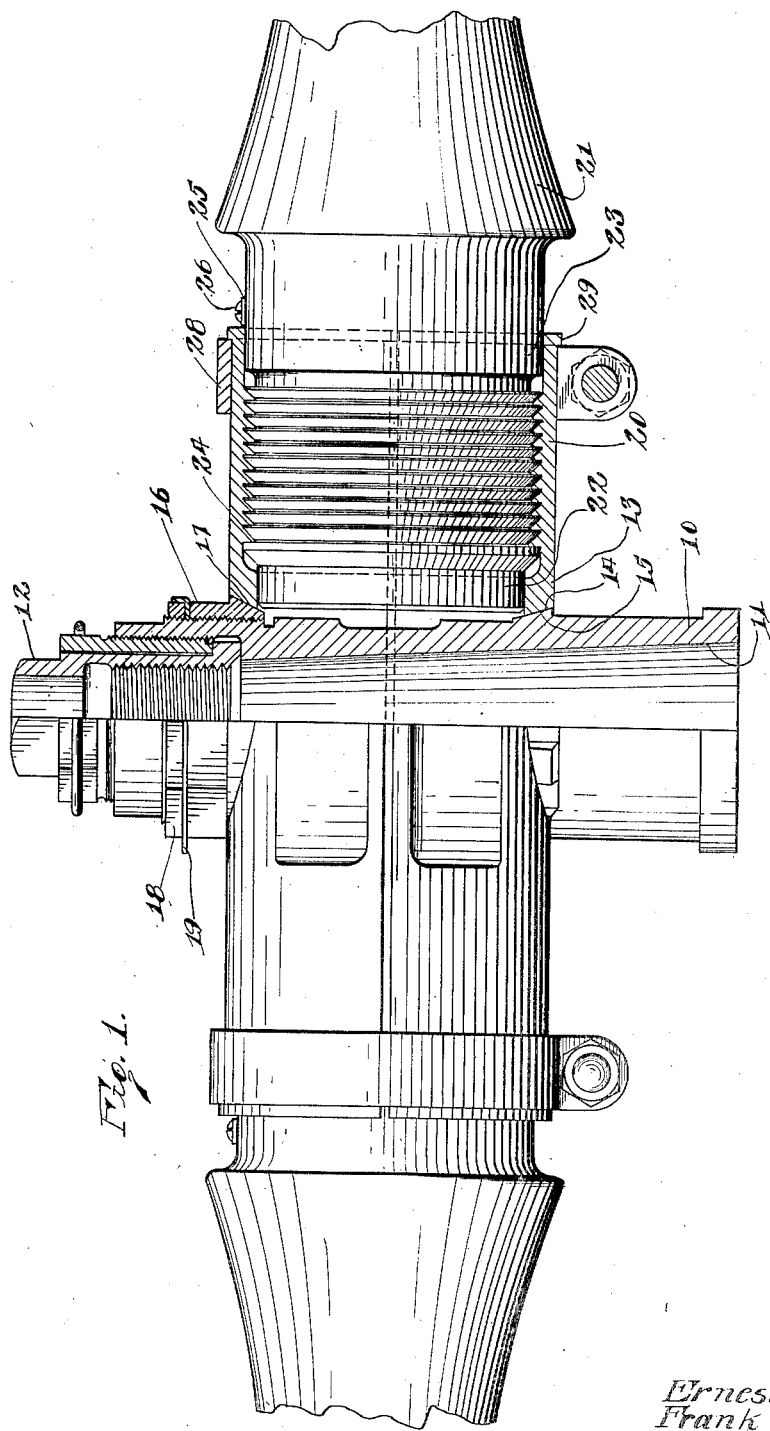
Figure 2:
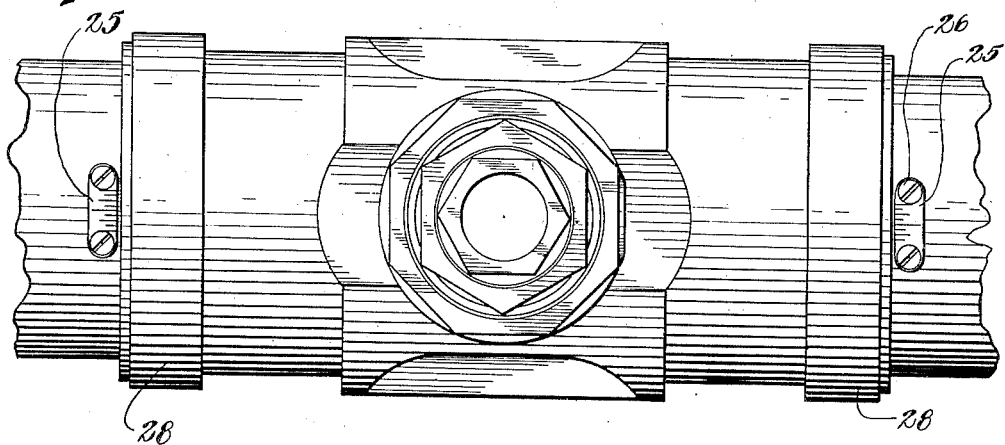
Figure 3:
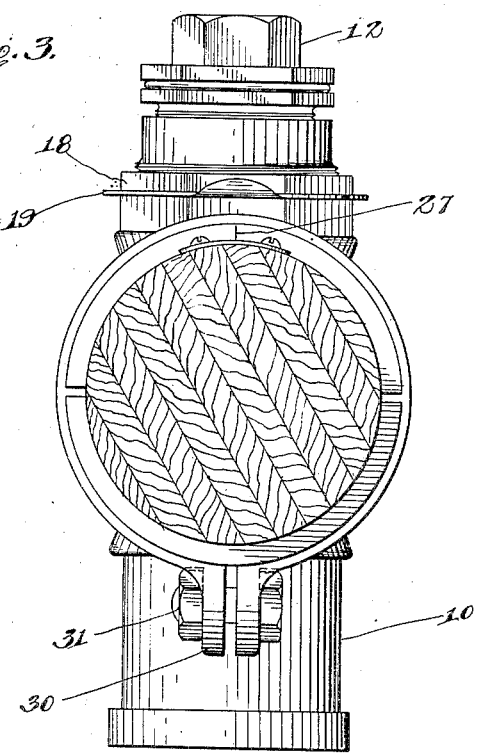

In the drawing, Fig. 1 is a view partly in section and partly in elevation, of the hub of a propeller, in which there is embodied the details of the present invention. Fig. 2 is a plan view of Fig. 1, and Fig. 3 is an end view in which the propeller blade is shown in section.

The propeller is carried upon a sleeve 10 keyed on the tapering end of the engine crank shaft, the latter fitting in the tapered bore 11 of the sleeve and having a nut 12 threading on its outer end within a recess in the outer end of the sleeve 10. The hub 13 is splined on the sleeve 10 and is divided on a longitudinal median plane to form half sections. The inner section has a tapered opening 14 centered by engagement with the bevel seat 15 on the sleeve 10. The outer section is centered with respect to the sleeve 10 by means of a nut 16, the tapered end of which engages in the tapered opening 17 in said section. The half sections are thus secured together in assembled relation on the sleeve 10 and are at the same time properly centered with respect thereto. A lock nut 18 and lock washer 19 having its edge bent over upon the nut 18, secure the nut 16 in its adjusted position.

The hub when assembled provides two diametrically opposed blade sockets 20 in each of which a propeller blade 21 is mounted. The blades are provided on their inner ends with cylinderical centering portions 22 and 23, received in similar cylindrical bearing portions of the sockets to center the blades relative to the hub. Both blades are held from endwise movement relative to the hub by the interfitting of parallel annular ridges and grooves of a buttress form shown at 24 on the inner ends of the blades 21 and inside the socket sections. This permits rotary adjustment of the blades in the hub for pitch setting. These interfitting ridges and grooves furthermore enable changing the diameter of the propeller, as the blades may be mounted with the ridges and grooves thereon in various positions in the sockets, the grooves and ridges being evenly spaced to permit such adjustment. A change in the diameter of the propeller can be made only when the hub is disassembled, one half section being disassembled to enable a change in the position of the blades endwise relative to the hub.

The pitch setting of the blades is indicated by means of index scales on dial plates 25, fastened by screws 26 on the shanks of the blades adjacent the hub. Index marks 27 on the hub co-operate with the scales which are marked in degrees, to indicate the extent of angular adjustment.

When the blades have been properly set to the desired pitch and for the proper diameter they may be secured rigidly in such adjusted positions by means of clamping rings 28 encircling the outer ends of the hub 13 and held from coming off by flanges 29. The rings 28 are split and the ends offset to provide lugs or ears 30 through which bolts 31 are passed to draw the ends together and thus clinch the blades in the hub. The clamping rings 28 are movable and rotatable for the purpose of changing the positions of the offset ends 30 and the bolts 31, which constitute weight elements, for balancing the propellers. Movement of the weight elements relative to the axis of rotation of the propeller serves to counteract any lack of balance between the blades on opposite sides of the axis.

We claim:—

1. In a propeller, a two-piece hub, a blade for said hub, interfitting parallel annular projections and grooves on the end of said blade and on the inside of said hub pieces to hold said blade against any endwise movement while permitting rotary adjustment thereof in said hub, an index scale on said blade movable in its rotary adjustment relative to an index mark on said hub to indicate the extent of angular adjustment, and a clamping band for clinching said hub on said blade in its adjusted position.

2. In a propeller, a two-piece hub forming when assembled a pair of diametrically opposed blade sockets, blades for said sockets, interfitting parallel annular projections and grooves in said sockets and on said blades preventing endwise movement of said blades when said hub is assembled but permitting rotary adjustment of said blades for pitch setting, and split clamping rings on said sockets for clamping said hub pieces together to secure said blades rigidly in adjusted positions.

3. In a propeller, a two-piece hub forming when assembled a pair of diametrically opposed blade sockets, blades for said sockets, interfitting parallel annular projections and grooves in said sockets and on said blades preventing endwise movement of said blades when said hub is assembled but permitting rotary adjustment of said blades for pitch setting, and split clamping rings on said sockets having offset bolting ends for clamping said hub pieces together to secure said blades rigidly in adjusted positions, said rings being movable on said sockets to different positions to alter the relation of the offset bolting ends to the axis of rotation of said propeller to effect a balance of said propeller.

4. In a propeller, an engine shaft sleeve, a hub to be mounted on said sleeve composed of two longitudinal halve pieces forming when assembled a pair of opposed blade sockets, blades for said sockets, interfitting projections and recesses on said blades and in said sockets for holding said blades when said hub is assembled thereon, and a nut threading on the end of said engine shaft sleeve against said hub to hold the pieces thereof together.

5. In a propeller, an engine shaft sleeve, a hub carried thereon composed of two pieces divided lengthwise forming when assembled a pair of opposed blade sockets, blades for said sockets, interfitting parallel annular grooves and projections on said blades and in said sockets for holding said blades against endwise movement when said hub is assembled thereon but permitting rotary adjustment of said blade for pitch setting, a nut threading on said engine shaft sleeve against said hub to hold the same assembled on said sleeve and to hold said hub pieces together to hold said blades rigidly in adjusted positions.

6. In a propeller, a two-piece hub divided on a longitudinal median plane forming a blade socket when assembled, a blade for said socket having the shank thereof provided with regularly spaced parallel annular ridges and grooves to interfit with similar grooves and ridges provided on the inside of said socket, said blade being adjustable rotatably in said socket and held against endwise movement when said hub is assembled thereon, said blades being adjustable endwise when said hub is disassembled by interfitting the grooves and ridges thereof in different ridges and grooves of said sockets, and means for clamping said hub pieces together to clinch said blades in adjusted assembled position in said socket.

7. In a propeller, a two piece hub divided on a longitudinal median plane forming a blade socket when assembled, a blade for said socket, said blade and socket having interfitting projections and recesses for holding said blade in said socket when said hub is assembled thereon, centering portions adjacent said projections and recesses on said blade and in said socket, and means for holding said hub pieces together.

8. In a propeller, an engine shaft sleeve, a two piece hub divided on a longitudinal median plane forming when assembled a pair of opposed blade sockets, blades for said sockets, interfitting projections and recesses on said blades and in said sockets for holding said blades in said sockets when said hub is assembled thereon, centering portions adjacent said projections and recesses on said blades and in said sockets, means for holding said hub pieces together with said shafts in said sockets, centering portions on said engine shaft sleeve and in said hub pieces, and means for holding said hub assembled on said sleeve.

9. In an adjustable pitch aeronautical propeller, a hub having two opposing blade receiving sockets, a blade for each socket, and means for securing each blade therein, comprising parallel annular interfitting projections and recesses on the blade and in said socket, permitting rotary adjustment of the blade in the socket in any setting thereof without affecting the propeller diameter, and said projections and recesses being evenly spaced and of comparatively small size and several in number to permit securing the blade in any one of a plurality of positions of adjustment endwise of the socket.

10. In a propeller, a two-piece hub forming when assembled a pair of diametrically opposed blade sockets, blades for said sockets, interfitting projections and grooves in said sockets and on said blades for holding said blades against endwise movement when said hub is assembled, and clamping rings on said sockets for securing said hub pieces together to secure said blades rigidly in adjusted positions, said rings being movable on said sockets to different positions for balancing said propeller.

11. In a propeller a hub split longitudinally to provide two halves forming a pair of opposed blade sockets when the halves are placed together, blades received in said sockets each having an end bearing received in recesses in the inner ends of said sockets and having bearing portions spaced from the ends of the blades received in said sockets at the outer ends of the latter and a series of similar small and evenly spaced parallel annular projections and grooves provided on said blade and in said socket between said bearing portions arrangd to interfit to prevent endwise movement of the blade out of said socket when the halves of the hub are secured together.

12. In a propeller, the combination of a hub providing a blade socket, a blade having a reduced end forming a bearing portion to be received in a bearing at the inner end of said socket and having a second bearing portion spaced from the end thereof received in the outer end of said socket and interfitting projections and recesses on said blade and in said socket between said bearing portions, for holding said blade against endwise movement from said socket.

13. In a propeller having a hub, and detachable and adjustable blades, means for securing said blades rigidly in adjusted position, parts of said means being movable to different operative positions to balance said propeller.

14. In a propeller having a hub, and blades extending diametrically from said hub, means on opposite sides of the axis of rotation of said hub, parts of said means on both sides of the axis of rotation being movable to different operative positions for balancing said propeller.

15. In a propeller having a hub and adjustable blades, means for securing said blades in longitudinally adjusted position on said hub, and means having a weighted portion adjustably mounted to be movable to different relative positions about the blade axis to balance the blades.

16. In a propeller having a hub and blades extending in opposite directions therefrom, means forming an assembled part of the propeller on opposite sides of the axis of rotation thereof, parts of said means being movable to different positions for balancing said propeller.

In testimony whereof we affix our signatures.

ERNEST G. McCAULEY.
FRANK W. CALDWELL.